US008345883B2

(12) United States Patent
Takumai et al.

(10) Patent No.: US 8,345,883 B2
(45) Date of Patent: Jan. 1, 2013

(54) AUDIO PLAYBACK METHOD AND APPARATUS USING LINE ARRAY SPEAKER UNIT

(75) Inventors: Susumu Takumai, Hamamatsu (JP); Akira Usui, Hamamatsu (JP)

(73) Assignee: Yamaha Corporation (JP)

( * ) Notice: Subject to any disclaimer, the term of this patent is extended or adjusted under 35 U.S.C. 154(b) by 1427 days.

(21) Appl. No.: 11/348,555

(22) Filed: Feb. 6, 2006

(65) Prior Publication Data

US 2006/0126878 A1 Jun. 15, 2006

Related U.S. Application Data

(63) Continuation of application No. PCT/JP2004/011675, filed on Aug. 6, 2004.

(30) Foreign Application Priority Data

Aug. 8, 2003 (JP) ................................ 2003-290686

(51) Int. Cl.
*H04R 5/00* (2006.01)
*H04R 25/00* (2006.01)
*H04R 9/06* (2006.01)
*H04B 3/00* (2006.01)

(52) U.S. Cl. ............ 381/18; 381/335; 381/186; 381/77; 381/17; 381/1

(58) Field of Classification Search .................. 381/333, 381/310, 335, 386, 356, 182, 336, 77, 92, 381/122, 111, 1, 17–19, 79
See application file for complete search history.

(56) References Cited

U.S. PATENT DOCUMENTS 4,837,826 A 6/1989 Schupbach
5,068,897 A 11/1991 Yamato et al.
5,109,416 A 4/1992 Croft
(Continued)

FOREIGN PATENT DOCUMENTS

DE 4013398 A1 10/1990
(Continued)

OTHER PUBLICATIONS

English translation of the relevant portion of the Office Action issued in Japanese Patent Application No. 2003-290686, dated Dec. 5, 2006.

(Continued)

*Primary Examiner* — Devona Faulk
(74) *Attorney, Agent, or Firm* — Rossi, Kimms & McDowell LLP

(57) ABSTRACT

A multi-channel audio system is constituted using at least one line array speaker unit, in which plural speakers are arrayed in line, wherein the same audio signal is supplied with a prescribed delay time to each of the speakers, thus forming plural sound beams. The plural sound beams are reflected on a wall surface and a ceiling of a room so as to form plural virtual sound sources surrounding a listening position, and emission directions and intensities of the sound beams are controlled so as to localize a phantom at a prescribed position based on the plural virtual sound sources. By appropriately arranging plural line array speaker units horizontally, vertically, and slantingly in such a way that each line array speaker unit forms sound beams distributed and spread in a sectorial form, it is possible to realize a surround audio system having a high degree of freedom with regard to setup positions for forming virtual sound sources.

17 Claims, 8 Drawing Sheets

U.S. PATENT DOCUMENTS

| | | | | |
|---|---|---|---|---|
| 5,325,435 | A | 6/1994 | Date et al. | |
| 5,724,430 | A | 3/1998 | Aarts et al. | |
| 5,809,150 | A | 9/1998 | Eberbach | |
| 5,953,432 | A * | 9/1999 | Yanagawa et al. | 381/335 |
| 6,005,947 | A | 12/1999 | Lim | |
| 6,169,806 | B1 | 1/2001 | Kimura et al. | |
| 6,343,132 | B1 | 1/2002 | Fukuhara | |
| 6,553,121 | B1 * | 4/2003 | Matsuo et al. | 381/17 |
| 6,816,597 | B1 | 11/2004 | Kawano | |
| 7,092,541 | B1 | 8/2006 | Eberbach | |
| 7,130,430 | B2 * | 10/2006 | Milsap | 381/77 |
| 7,260,235 | B1 * | 8/2007 | Henricksen et al. | 381/335 |
| 7,319,641 | B2 | 1/2008 | Goudie et al. | |
| 7,349,641 | B2 | 3/2008 | Ogashima | |
| 7,577,260 | B1 | 8/2009 | Hooley et al. | |
| 2004/0047479 | A1 * | 3/2004 | Porzilli et al. | 381/182 |
| 2004/0240697 | A1 * | 12/2004 | Keele, Jr. | 381/336 |
| 2006/0050897 | A1 | 3/2006 | Asada et al. | |
| 2009/0129602 | A1 | 5/2009 | Konagai et al. | |

FOREIGN PATENT DOCUMENTS

| | | | |
|---|---|---|---|
| EP | 1 199 907 | A2 | 4/2002 |
| EP | 1 199 907 | A3 | 4/2002 |
| JP | 62-292098 | A | 12/1987 |
| JP | 2-224495 | A | 9/1990 |
| JP | 02-224495 | A | 9/1990 |
| JP | 6-35489 | A | 2/1994 |
| JP | 06-035489 | A | 2/1994 |
| JP | 6-178379 | A | 6/1994 |
| JP | 06-205496 | A | 7/1994 |
| JP | 6-205496 | A | 7/1994 |
| JP | 7-87590 | A | 3/1995 |
| JP | 8-511396 | A | 11/1996 |
| JP | 08-511396 | A | 11/1996 |
| JP | 2000-36993 | A | 2/2000 |
| JP | 2001-128279 | A | 5/2001 |
| JP | 2002-500844 | A | 1/2002 |
| JP | 2002-525961 | A | 8/2002 |
| JP | 2003-510924 | A | 3/2003 |
| JP | 2004-179711 | A | 6/2004 |
| WO | 95/26102 | A1 | 9/1995 |
| WO | 98/54926 | A1 | 12/1998 |
| WO | 00/18031 | A1 | 3/2000 |
| WO | 00/59265 | A1 | 10/2000 |
| WO | 01/23104 | A2 | 4/2001 |
| WO | 01/62045 | A1 | 8/2001 |

OTHER PUBLICATIONS

Relevant portion of International Search Report of corresponding PCT Application PCT/JP2004/011675.

Dictionary reference directed to the word “Tonsaulen” (German): p. 444.

Press release by Pioneer Corporation; Nov. 28, 2002, from http://www.pioneer.co.jp/press/release3661.j-html, retrieved on Jan. 12, 2006.

Supplementary European Search Report issued in corresponding European Patent Application No. 04771642.8 dated Mar. 3, 2010.

Pioneer Co., Ltd publication from http://www.pioneer.jp/press/2002/1128-1, dated Nov. 28, 2002, also cited in the present specification “http://www.pioneer.co.jp/press/release366-j.html”.

Relevant portion of International Search Report of Corresponding PCT Application PCT/JP 2004/017639. Cited in Related U.S. Appl. Nos. 10/579,895 & 12/357,147.

Notification of Reason for Refusal issued in corresponding Japanese Patent Application 2003-392085 dated Jan. 22, 2008. Cited in Related U.S. Appl. Nos. 10/579,895 & 12/357,147.

Supplementary European Search Report issued in corresponding European Patent Application No. 04799841.4 dated Dec. 7, 2009. Cited in Related U.S. Appl. Nos. 10/579,895 & 12/357,147.

* cited by examiner

AUDIO PLAYBACK METHOD AND APPARATUS USING LINE ARRAY SPEAKER UNIT

This is a Bypass Continuation of PCT International Application PCT/JP2004/011675 filed on Aug. 6, 2004, and claims priority under 35 U.S.C. §119(a) from JP 2003-290686 filed on Aug. 8, 2003.

TECHNICAL FIELD

This invention relates to audio playback methods and apparatuses using line array speaker units, and in particular to multi-channel audio playback methods and apparatuses that are constituted by combining line array speaker units with television receivers and displays.

BACKGROUND ART

Recently, home theater systems, which give home users the feelings of being at live performances realized as visual and audio performances in theaters such as cinemas, have come to have a high popularity among people. A home theater system for home use is generally designed such that plural speakers are arranged to surround a listening position, and this is known as a 5.1-channel surround system. However, such an audio surround system constituted by plural speakers is complicated in wiring and is troublesome in setup due to limitations regarding arrangement of speakers. In addition, the audio surround system needs a relatively large space for installation. For this reason, the conventionally-known audio surround system cannot realize a simple system configuration for users who are to enjoy multi-channel audio.

There has been provided a technology for reproducing in an artificial manner audio surround effects using a 2-channel stereo speaker system, and this is known as an audio virtual surround system. However, it suffers from various problems such as artificiality in audio reproduction, limitations of listening environments, absence of feeling of being at a live performance, and degradation of sound quality. Hence, it has not come to be the current standard in home audio sound systems.

Recently, there has been provided another technology using a panel-type speaker array apparatus in which virtual sound sources are formed at prescribed positions surrounding a listener. This technology is disclosed in Japanese Patent Application Publication No. 2003-510924, a document provided by Pioneer Co. Ltd. (which can be retrieved via the Internet; URL: http://www.pioneer.co.jp/press/release 366-j.html), and a document regarding digital sound projectors provided by 1 Limited Co. (which can be retrieved via the Internet; URL: http://www.1 limited.com/lib/sound_projector_japanese.pdf), for example.

The aforementioned panel-type speaker array apparatus is constituted using plural speakers that are arrayed on a panel surface in a two-dimensional manner. The audio surround system using the panel-type speaker array apparatus performs delay control in such a way that sounds emitted by speakers focus on a single point in space, thus forming sound beams. The sound beams formed are reflected by wall surfaces in prescribed directions so as to form virtual sound sources surrounding a listener, thus realizing a multi-channel audio surround system using a single speaker array arranged in front of the listener.

The aforementioned audio surround system using the panel-type speaker array apparatus is capable of freely forming plural sound beams traveling in prescribed directions in front of a panel surface, and, it can freely localize sounds at prescribed positions with respect to separate channels. However, it is necessary to arrange numerous speakers (e.g., 254 speakers) in a two-dimensional manner in order to realize sound beam control having high directivity, and each speaker needs an audio circuit. Therefore, the aforementioned audio surround system is very expensive. In addition, it has problems due to the large overall area of a speaker array of a panel-type shape and a low degree of freedom regarding layout and setup position when it is combined with a display.

In consideration of the aforementioned circumstances, it is an object of this invention to provide a space-saving multi-channel audio playback system having a good live performance effect.

It is another object of this invention to realize a cost-saving speaker array for use in the aforementioned multi-channel audio playback system.

It is a further object of this invention to provide an audio playback system that is capable of freely controlling virtual sound sources and sound localization by use of sound beams, which are distributed in a sectorial form and are produced by means of line array speaker units each having limited directivity control.

DISCLOSURE OF THE INVENTION

This invention relates to an audio playback system using a line array speaker unit in which a plurality of speakers are arrayed in line, characterized in that the same audio signal is supplied to all speakers with prescribed delay times therefor so as to form a plurality of sound beams, thus forming a plurality of virtual sound sources, based on which a virtual sound image of the audio signal is formed at a prescribed position. In order to localize a virtual sound image, sound beams are appropriately controlled in emission direction and intensity.

In the above, it is not necessary to use a single line array speaker unit; instead, it is possible to use a plurality of line array speaker units, which are appropriately arranged and are combined with a display and the like. For example, line array speaker units may be arranged in a horizontal direction, a vertical direction, or a slanted direction, thus localizing a virtual sound image.

BEST MODE FOR CARRYING OUT THE INVENTION

This invention will be described by way of a preferred embodiment with reference to the drawings.

Figure 1:
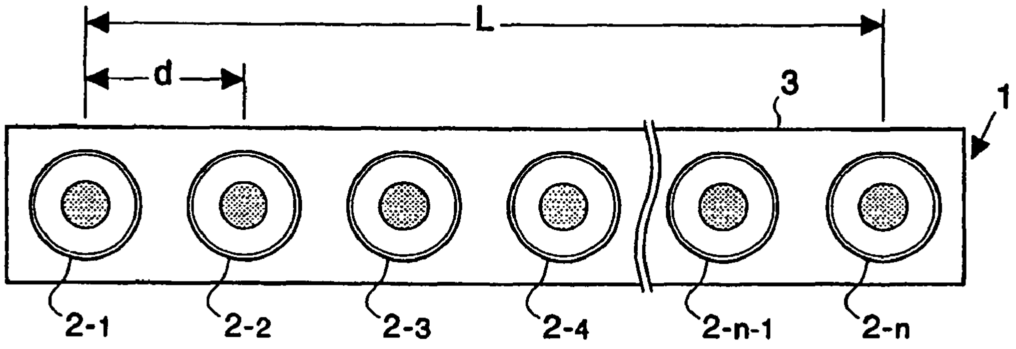
FIG. 1 is a front view showing an exterior appearance of a line array speaker unit adapted to an audio playback system in accordance with a preferred embodiment of this invention.

FIG. 1 shows the structure of a line array speaker unit for use in an audio playback system in accordance with an embodiment of this invention. A line array speaker unit 1 is constituted by uniformly arraying a plurality of (i.e., n) speakers 2 (denoted by reference numerals 2-1 to 2-*n*) in line within a linear enclosure (or a housing) 3. A distance L between the adjacent speakers 2 and a length L (i.e., a distance between ends of speakers) of a speaker array (i.e., a group of speakers arrayed in line) are determined in correspondence with an audio frequency band used for sound beam control. For example, the distance d between the adjacent speakers is reduced in order to realize controlling of high frequencies; and the enclosure is elongated so as to increase the length L of the speaker array in order to realize controlling of low frequencies.

Figure 2A:
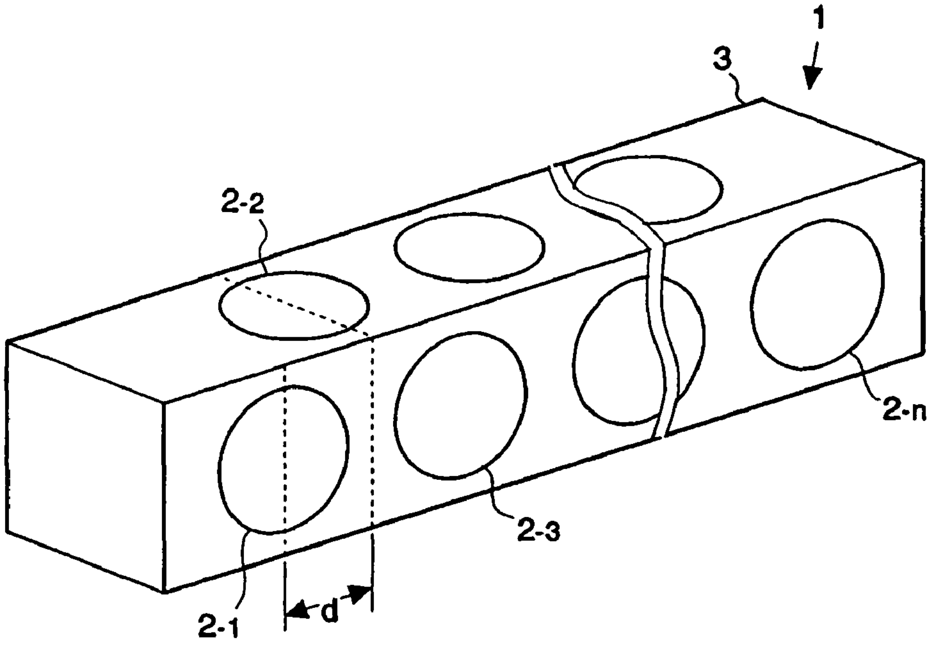
FIG. 2A is a perspective view showing an example of a line array speaker unit in which a plurality of speakers are arrayed on two surfaces of a housing.
Figure 2B:
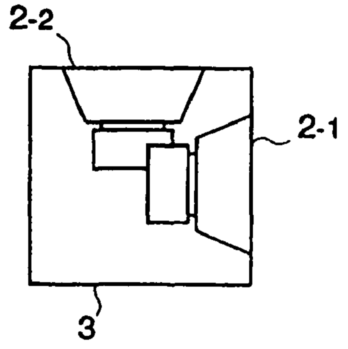
FIG. 2B is a cross-sectional view of the line array speaker unit shown in FIG. 2A.

In order to realize further controlling of high frequencies, and in order to increase the mixed audio output of speakers by increasing a density of arranging speakers, the speakers 2 are arranged alternately on the two surfaces of the enclosure 3 as shown in FIGS. 2A and 2B, whereby it is possible to substantially reduce the distance d between the adjacent speakers 2 without increasing the front-surface area of the enclosure 3. By arranging the speakers in a zigzag manner on the two surfaces of the enclosure 3, it is possible to reduce the distance d between the adjacent speakers to be less than the diameter of each speaker; hence, in comparison with a speaker array in which plural speakers are arrayed in line, it is easy to perform audio control with respect to high frequencies, and it is therefore possible to increase the audio output.

Incidentally, it is possible to use generally-known cone-shaped speakers as the aforementioned speakers; and it is possible to use horn speakers, because they are expected to realize improvements with regard to directivity and sound emission efficiency in front of a panel. Alternatively, it is possible to use different types of speakers having different performances.

Figure 3A:
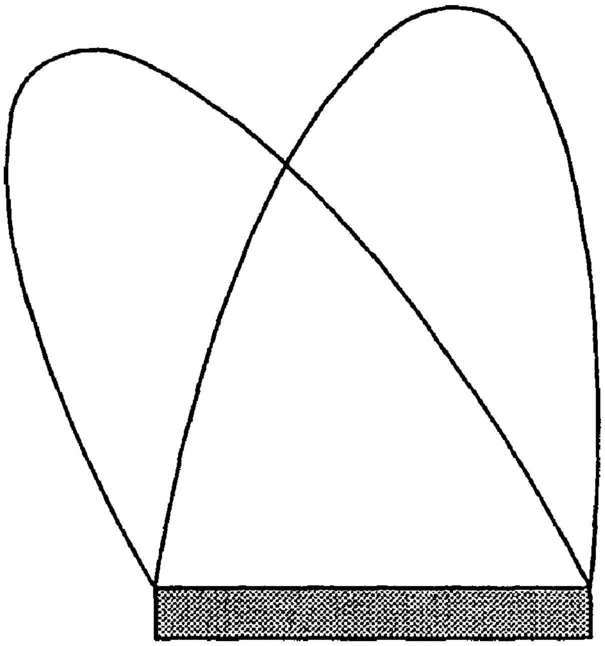
FIG. 3A shows a distribution of sound beams in a horizontal plane of the line array speaker unit.
Figure 3B:
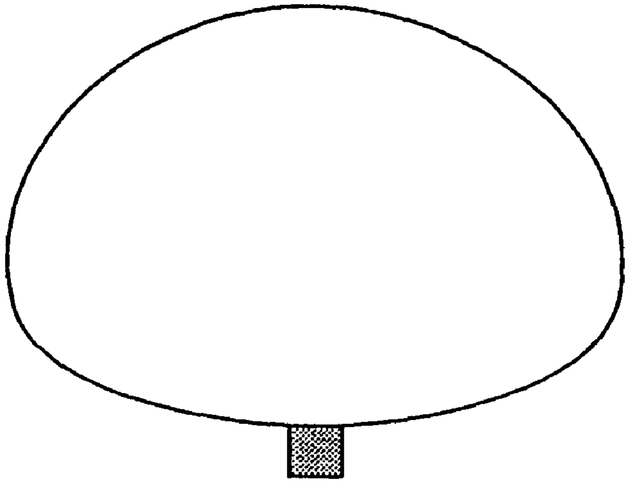
FIG. 3B shows a distribution of sound beams in a vertical plane of the line array speaker unit.

FIGS. 3A and 3B show conceptual distributions of sound beams (i.e., propagation ranges of sound waves) formed by line array speaker units. When the same audio signal is supplied to the speakers 2-1 to 2-*n*, which are arrayed in line to form a speaker array, with different phases, sound waves converge into beams propagating in specific directions in a plane including the speaker array as shown in FIG. 3A. When plural audio signals are subjected to separate audio beam control in different directions and are then mixed together into a single signal to be supplied to the speakers, they are output in the form of sound beams being emitted in different directions.

On the other hand, in a vertical plane perpendicular to the array of speakers forming a speaker array as shown in FIG. 3B, audio signals are not subjected to directivity control. That is, sound beams respectively propagate with directivities originally set for speakers.

Therefore, when audio signals are subjected to audio beam control in a line speaker array, it is possible to produce a sectorial distribution of sound beams spreading in a direction perpendicular to the speaker array, which is subjected to angular control in an axial direction of the speaker array.

An audio control method and an audio system, which realize the formation of a virtual sound image (fantom: a phantom or a phantom channel) in the rear of a listener by use of a line array speaker unit that is capable of forming sound beams, will be explained.

The aforementioned phantom indicates a phantom of a sound image (or a sound source) that is formed based on sound image localization using a 2-channel stereo system, and it is referred to as a phenomenon that allows a listener to sense the existence of a sound image at an intermediate position between his ears on the basis of a time difference and a volume difference between a sound heard at his right ear and a sound heard at his left ear in the head of the listener.

It is disclosed in the documents retrieved via the Internet that using an array speaker makes it possible to set a focal point of sound beams on a wall surface of a room, thus forming virtual sound sources on the wall surface. Using a speaker system of a matrix array as disclosed in the aforementioned documents makes it possible to form sound beams that are narrowed down sharply; hence, virtual sound sources formed on the wall surface can be directly used as surround sound sources. However, in the case of the line array speaker unit of this invention, sound beams are narrowed down into a sectorial form so that audio distribution thereof may slightly spread; therefore, it is difficult to use virtual sound sources directly, which are formed as described above, as surround sound sources.

For this reason, the present embodiment forms sound beams emitted in plural directions based on an audio signal of the same channel, thus forming plural broad virtual sound sources, whereby sound beam control is performed to form a phantom at a prescribed position in such a way that plural sounds emitted thereby reach and are picked up by left and right ears of a listener. This phantom is used as a surround sound source.

It is possible to form plural sound beams with respect to the same channel by use of a single line array speaker unit. Alternatively, it is possible to combine plural line array speaker units, which are arranged in different directions as shown in FIGS. 4A to 4E, thus allowing the line array speaker units to form sound beams emitted in different directions. As described above, by appropriately combining plural line array speaker units while changing their directions in arrangement, it is possible to form a more clear phantom.

Figure 4A:
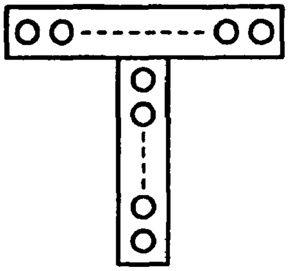
FIG. 4A shows a first example in which two line array speaker units are arranged in a T-shape form.
Figure 4B:
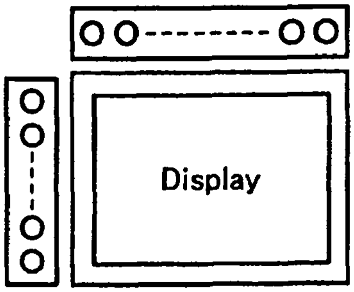
FIG. 4B shows a second example in which two line array speaker units are arranged in an L-shape form.
Figure 4C:
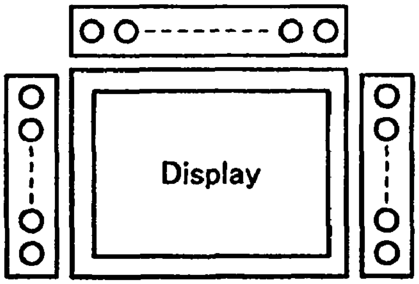
FIG. 4C shows a third example in which three line array speaker units are arranged in a reverse-U-shape form.
Figure 4D:
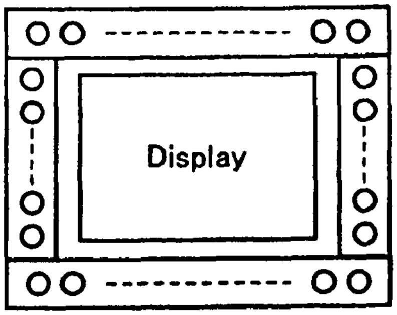
FIG. 4D shows a fourth example in which four line array speaker units are arranged in a rectangular form surrounding a display.
Figure 4E:
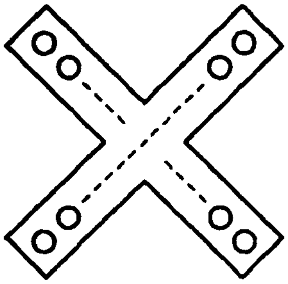
FIG. 4E shows a fifth example in which two line array speaker units are arranged in an X-shape form.
Figure 4F:
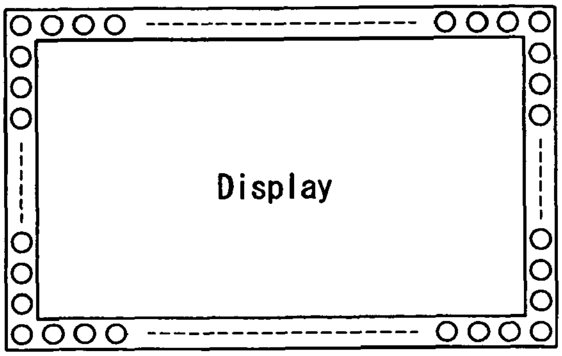
FIG. 4F shows a sixth example, i.e., a modification of the arrangement of line array speaker units shown in FIG. 4D.

Specifically, FIG. 4A shows a first example in which two line array speaker units are combined in a T-shape form: FIG. 4B shows a second example in which two line array speaker units are combined in an L-shape form; FIG. 4C shows a third example in which three line array speaker units are combined in a reverse U-shape form on the left, right, and top of a display; FIG. 4D shows a fourth example in which four line array speaker units are combined in a rectangular form surrounding a display; and FIG. 4E shows a fifth example in which two line array speaker units are combined in an X-shape form. FIG. 4F shows a sixth example, i.e., a modification of the arrangement of line array speaker units shown in FIG. 4D.

In the second to sixth examples shown in FIGS. 4B to 4F, plural line array speaker units are combined with a display for visual presentation. Herein, the display and line array speaker units can integrally join together; alternatively, the display and line array speaker units can be constituted using different housings, which are appropriately combined together.

In the second example shown in FIG. 4B, two line array speaker units are not arranged symmetrically on the left and right; however, the vertically installed line array speaker unit can emit sound beams spreading horizontally; hence, audio outputs are not necessarily produced in an asymmetrical manner.

In the third example shown in FIG. 4C, plural speakers are arranged similarly to the front-side speakers used in a normal audio surround system; hence, it may produce a small difference in terms of visual feelings for users. In this example, it is possible to set up virtual sound sources by performing sound beam control on all the channels of 5.1-channel surround audio; and when sound beam control is performed on surround channels only, it is possible to produce audio outputs similarly to with the conventional technology by use of three line array speaker units for channels L, R, and C. In this case, a virtual sound source or a phantom is set to only the rear-side surround channel.

In the fifth example shown in FIG. 4E, two line array speaker units cross together in an X-shape form, so that they are slanted with respect to each other. The fifth example is advantageous because it can realize sound beam control in a slanted direction, which cannot be realized by merely arranging line array speaker units vertically or horizontally. The slanted direction may realize a sound beam path that can maximize the distance from a listening position to a sound beam generating position, and it may cause overlapping of sounds at the listening position less frequently. Therefore, in comparison with the other examples, this example can improve a ratio between direct sound and indirect sound.

In the sixth example shown in FIG. 4F, a display and line array speaker units are integrally combined together in housing. In this example, speakers are also arranged at prescribed positions corresponding to four corners of the rectangular display. By arranging speakers at corners, it is possible to realize the use of line array speaker units lying horizontally and the use of line array speaker units lying vertically. In addition, it is possible to realize the use of line array speaker units lying in both the horizontal and vertical directions. Furthermore, it is possible to increase low-frequency sound playback ability by increasing the diameter of each speaker.

Figure 5:
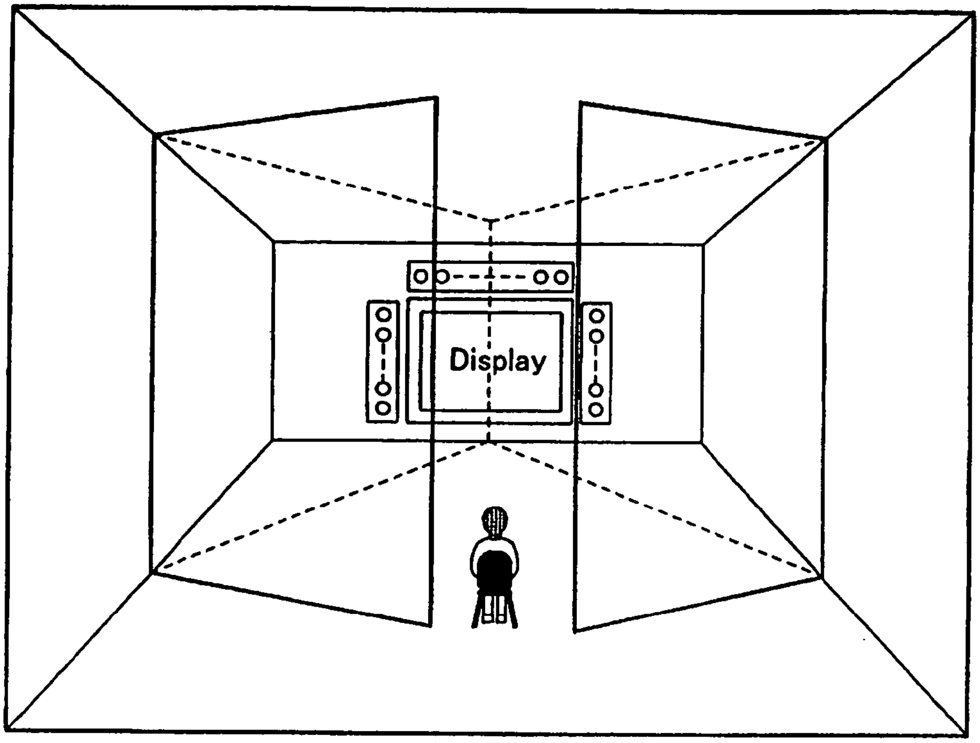
FIG. 5 shows a reflection state of sound beams formed by line array speaker units arranged horizontally in a room.
Figure 6:
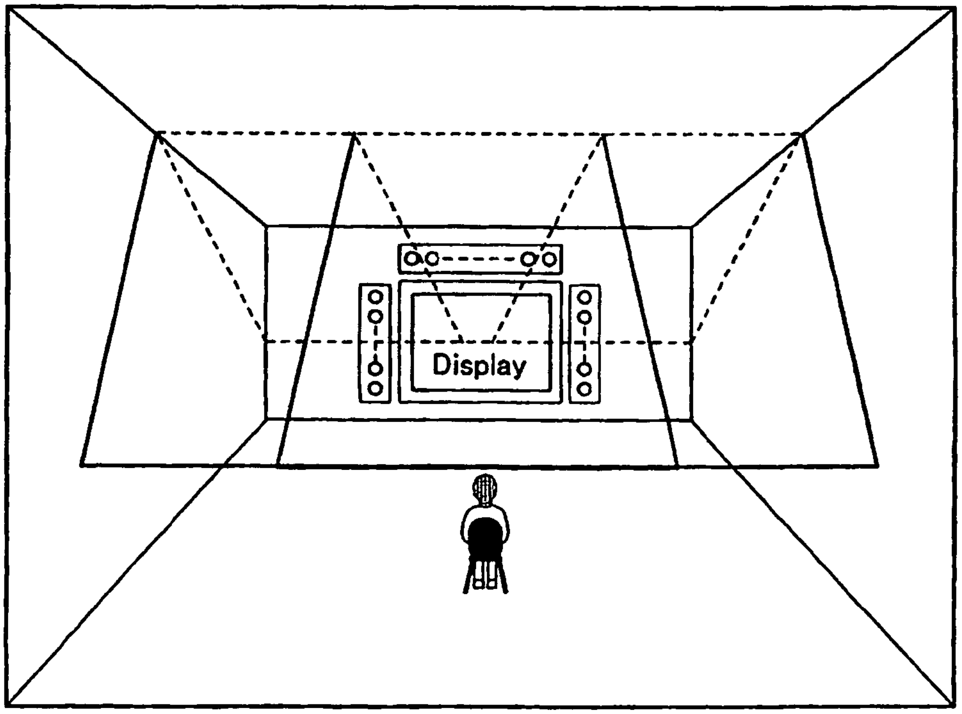
FIG. 6 shows a reflection state of sound beams formed by line array speaker units arranged vertically in a room.
Figure 7:
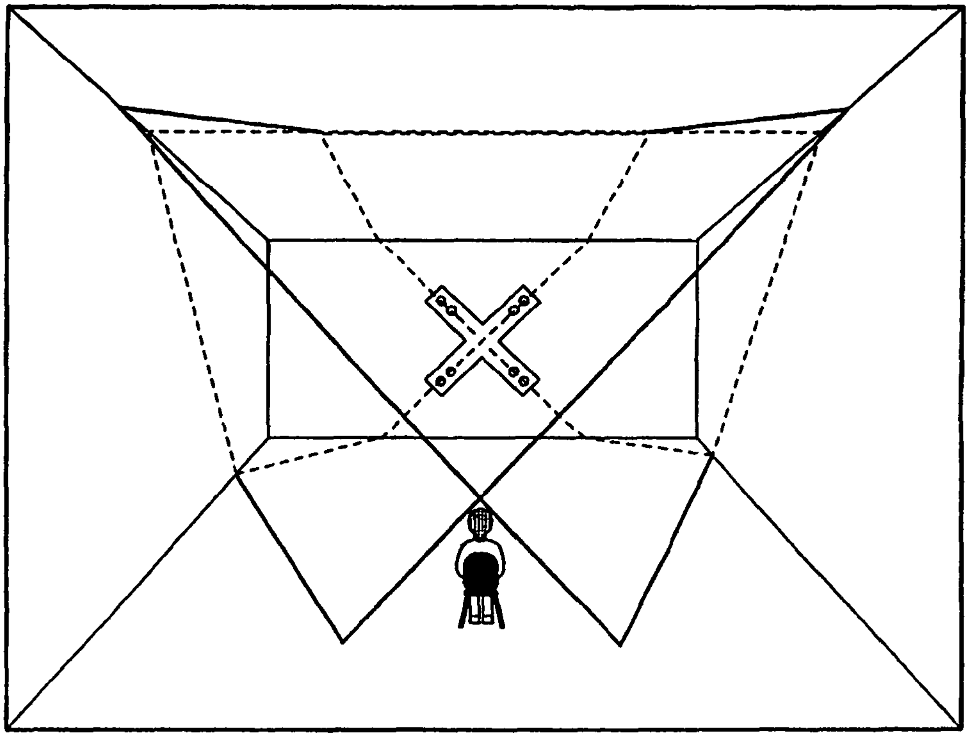
FIG. 7 shows a reflection state of sound beams formed by line array speaker units arranged in a slanted manner in an X-shape form in a room.

FIGS. 5, 6, and 7 show locus and reflection with respect to sound beams, which are formed by arranging plural line array speaker units vertically, horizontally, and slantingly.

FIGS. 5 and 6 show correlations between a listener and sound beams emitted from three line array speaker units, which are combined with a display in a reverse U-shape form as shown in FIG. 4C.

That is, FIG. 5 shows a distribution of sound beams formed by the horizontally-arranged line speaker unit on the top of the display, and this line array speaker unit outputs sound beams that are subjected to directivity control so as to reduce a horizontal spreading angle. Sound beams are distributed in a broad sectorial form in the upper and lower sides (or in a vertical direction). The horizontally-arranged line array speaker unit can form sound beams that focus on side walls and a rear wall of the room from the perspective of the listener.

FIG. 6 shows a distribution of sound beams formed by the vertically-arranged line array speaker units on the left and right of the display, and these line array speaker units form sound beams that are subjected to directivity control so as to reduce a vertical spreading angle. Sound beams are distributed in a broad sectorial form in the horizontal direction. The vertically-arranged line array speaker units can form sound beams that focus on a ceiling and a rear wall of the room from the perspective of the listener.

FIG. 7 shows a distribution of sound beams formed by two line array speaker units, which are combined in an X-shape form in slanted directions as shown in FIG. 4E. Each of the line array speaker units can reduce a spreading angle in a setup direction thereof; hence, it is possible to form sound beams of slanted angles, which spread in a direction perpendicular to the setup direction. That is, within two line array speaker units, the line array speaker unit, which lies in a plane intersecting the upper right and the lower left from the perspective of the listener, can reduce a spreading angle in a plane intersecting the upper right and the lower left, thus realizing a distribution of sound beams spreading in a plane intersecting the upper left and the lower right. Sound beams can focus on an upper-right corner of a ceiling and a rear wall.

As described above, the line array speaker units can each form sound beams spreading in a broad sectorial form, whereas they may not form clear focal points. Due to the leading sound effect (or hearth effect), it is possible to set a virtual sound source on a wall surface in a direction in which sound reaches the listener first. Herein, the leading sound effect indicates psychoacoustic characteristics in which when the same sound reaches a listener with time differences from a relatively broad range of area, the listener may feel as if a sound image is localized in a direction, in which the sound reaches the listener first, within the range of area. Therefore, it is required that a virtual sound source be set on a wall surface (or a ceiling surface) in a direction, in which sound reaches the listener first; thus, a phantom is formed based on plural virtual sound sources, each of which is set up as described above.

Line array speaker units each have characteristics in which sound is localized in a relatively broad range of area. Hence, it is possible to reduce artificiality in which surround-channel sounds, which are produced upon the installation of surround speakers, become very clear in localization. Thus, it is possible to realize surround audio playback in a more natural manner.

FIG. 8 and FIGS. 9A to 9D show procedures in which plural virtual sound sources are formed by use of sound beams formed using line array speaker units, and a phantom is formed based on plural virtual sound sources.

Figure 8:
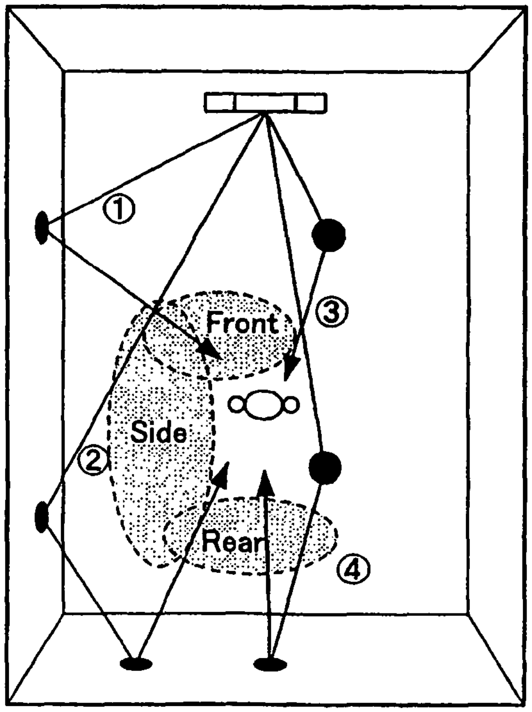
FIG. 8 shows how to localize phantom at a certain position by use of plural sound beams emitted from line array speaker units.

In FIG. 8, reference symbols ① and ② show sound beams emitted from a horizontally-arranged line array speaker unit; and reference symbols ③ and ④ show sound beams emitted from a vertically-arranged line array speaker unit. When the same audio source (or the same audio channel) is played back by use of the sound beams ① and ③, upon the adjustment of a volume balance, it is possible to create a phantom slantingly in front of a listener, i.e., on a line connecting two virtual sound sources respectively formed at a side wall and a ceiling viewed from the perspective of the listener. Similarly, it is possible to create a phantom at the side of a listener by use of the sound beams ① and ②; and it is possible to create a phantom slantingly at the rear of a listener by use of the sound beams ② and ④. As described above, plural sound beams are formed and combined together with respect to a single audio source, and tone volumes thereof are respectively and appropriately adjusted; thus, it is possible to freely create a phantom at a desired position around the listener, and it is possible to localize a sound image.

Figure 9A:
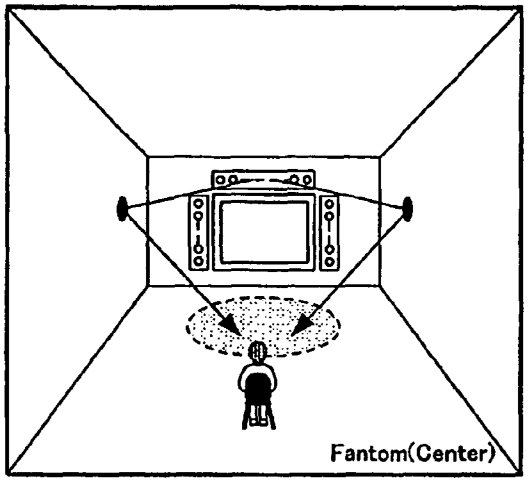
FIG. 9A shows how to localize phantom by use of sound beams formed by line array speaker units at the center of the front of a listener.
Figure 9B:
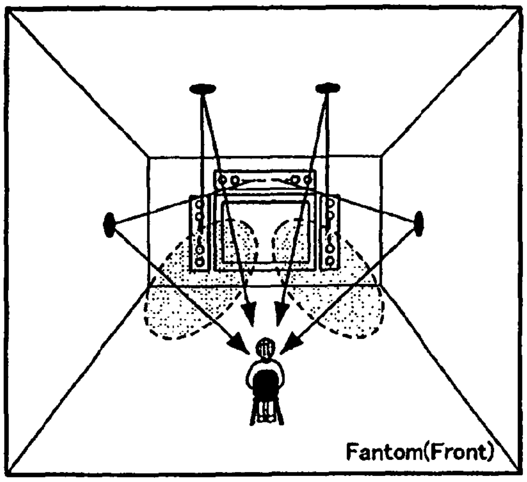
FIG. 9B shows how to localize phantom by use of sound beams formed by line array speaker units at the front of a listener.
Figure 9C:
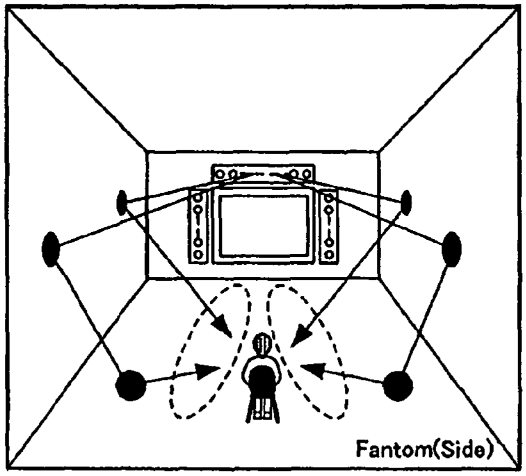
FIG. 9C shows how to localize phantom by use of sound beams formed by line array speaker units at sides of a listener.
Figure 9D:
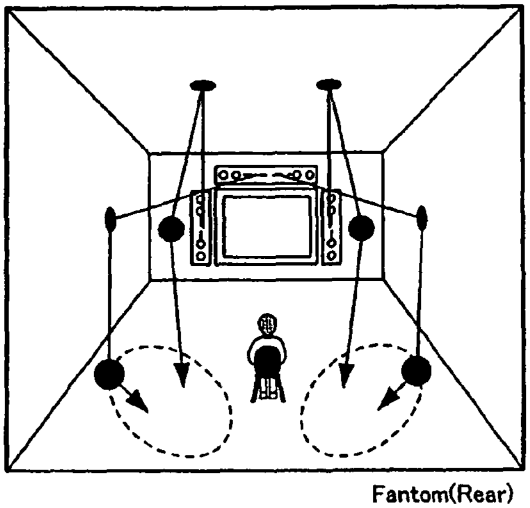
FIG. 9D shows how to localize phantom by use of sound beams formed by line array speaker units at the rear of a listener.

FIG. 9A shows an example of the formation of sound beams by which a phantom is formed at the front center of a listener; FIG. 9B shows an example of the formation of sound beams by which a phantom is formed in front of a listener; FIG. 9C shows an example of the formation of sound beams by which a phantom is formed at the side of a listener; and FIG. 9D shows an example of the formation of sound beams by which a phantom is formed at the rear of a listener. Plural (e.g., two) broadened virtual sound sources are formed on the wall surfaces at the left and right of a listener; hence, the listener can acoustically recognize a phantom being formed at an intermediate position between these virtual sound sources. By adequately controlling parameters such as emission directions of sound beams and volume levels, it is possible to control the phantom to be localized at a desired position.

Next, an audio playback apparatus for realizing a phantom localizing function using the aforementioned line array speaker unit will be explained.

Figure 10:
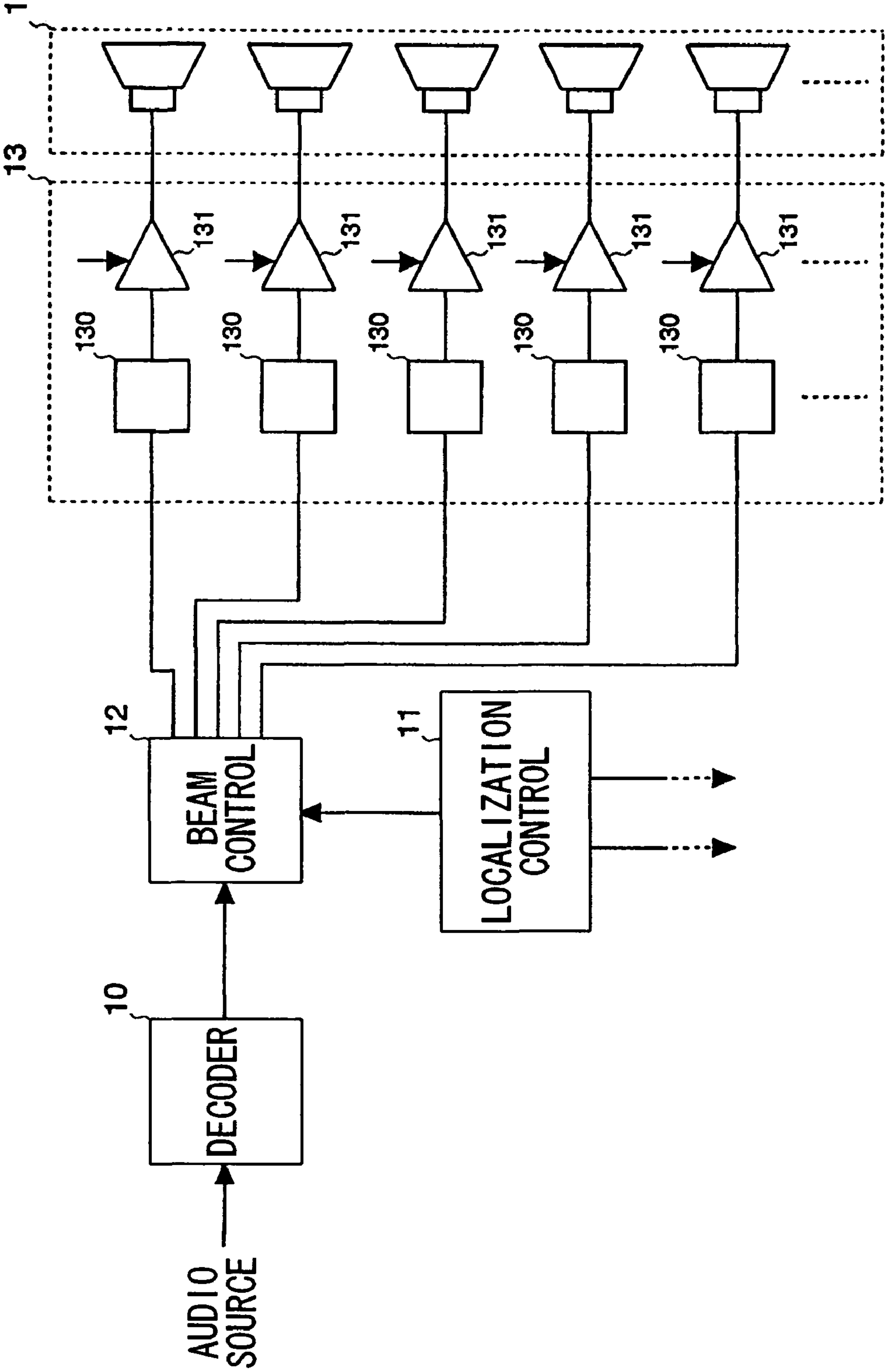
FIG. 10 is a block diagram showing the constitution of an audio playback apparatus in accordance with the preferred embodiment of this invention.

FIG. 10 is a block diagram showing the constitution of an audio playback apparatus in accordance with the present embodiment. This audio playback apparatus is connected to a line array speaker unit 1, which has plural speakers and which is constituted by a decoder 10 for decoding an audio source (i.e., an audio signal), a localization control block 11 for controlling localization of a phantom, a beam control block 12 for controlling emission directions and levels of sound beams corresponding to channels of audio sources in order to realize the localization of the phantom, and an audio circuit 13 for driving speakers of the line array speaker unit 1. When plural line array speaker units are combined so as to form an integrated speaker system as shown in FIGS. 4A to 4F, there are provided plural sets of the beam control block 12 and the audio circuits 13 for the plural line array speaker units.

As the audio source input to the aforementioned audio playback apparatus, it is possible to use 5.1-channel surround digital signals, for example. Such digital signals are divided into digital audio signals with respect to the channels by means of the decoder 10. Digital audio signals are input into the beam control block 12. The beam control block 12 is constituted using a digital signal processor (DSP).

The localization control block 11 is constituted using a microcomputer, which determines the following control parameters and sends them to the beam control block 12.

(1) A position for localizing a phantom that is formed in correspondence with channels of audio signals.

(2) A setup position of a virtual sound source for use in the localization of the phantom.

(3) An emission direction in which a sound beam is controlled to be emitted in order to set up the virtual sound source.

(4) Setup of gains and delays applied to audio signals that are input into speakers in order to form sound beams.

Figure 11:
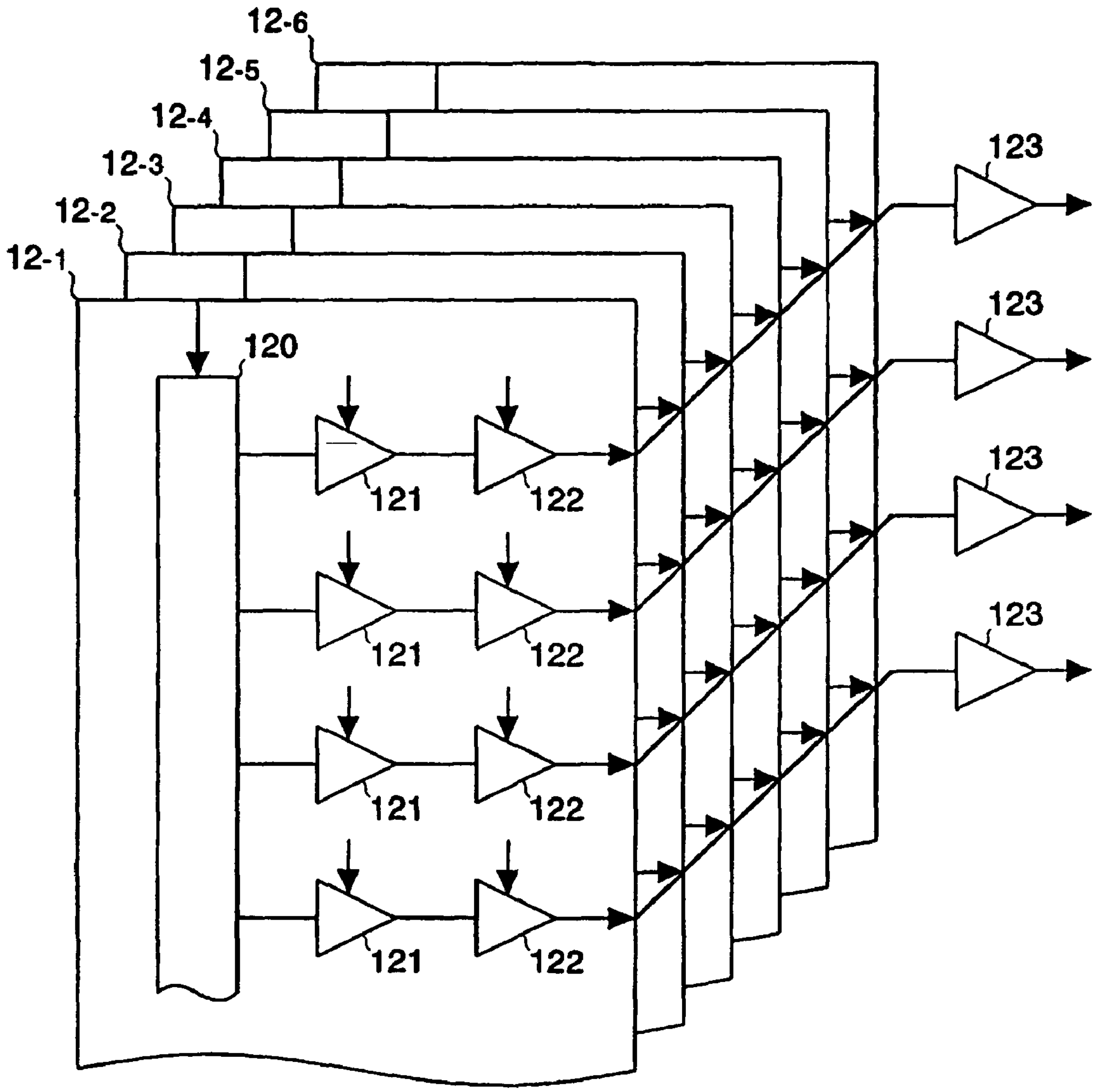
FIG. 11 is a block diagram showing the internal constitution of a beam control block of the audio playback apparatus shown in FIG. 10.

FIG. 11 is a block diagram showing the internal constitution of the beam control block. The beam control block 12 has beam control units 12-1 to 12-6, the number of which corresponds to the number of 5.1 channels. Each beam control unit has a delay 120, and n sets of coefficient multipliers 121 and 122 in correspondence with plural speakers forming a line array speaker unit. The delay 120 has plural taps; and tap positions and coefficients adapted to the coefficient multipliers 121 and 122 are determined by the localization control block 11. In addition, emission angles of sound beams are determined based on the tap positions of the delay 120. The coefficient multipliers 121 are supplied with prescribed coefficients that are necessary to maintain a prescribed balance between sound beams by canceling variations of volumes of speakers caused by the delay 120. Window functions for canceling side lobes of sound beams are applied to the coefficient multipliers 122. As window functions, it is possible to use Hamming windows or Hanning windows.

The outputs of the beam control units corresponding to the channels are added together by means of adders 123 with respect to the speakers and are then supplied to the audio circuit 13.

In FIG. 10, the audio circuit 13 has plural sets of D/A converters 130 and audio amplifiers 131, the number of which corresponds to the number of speakers forming a line array speaker unit. Digital audio signals, which are output from the beam control block 12 to the speakers, are input into the D/A converters 130. It is explained in conjunction with FIG. 11 that digital audio signals represent addition results of audio signals with respect to the channels. D/A converters 130 convert digital audio signals into analog audio signals, which are then output to the audio amplifiers 131. Analog audio signals are amplified by the audio amplifiers 131 and are then supplied to the speakers, thus producing desired sounds.

As described above, the audio playback method and apparatus of this invention do not use a panel-type array speaker but uses a combination of plural line array speaker units, each of which arrays plural speakers, so as to realize desired virtual sound sources and the localization of a phantom.

By appropriately changing the arrangement and structure of the line array speaker unit, sound beams emitted from the line array speaker unit can be distributed in a sectorial form, and virtual sound sources are formed at prescribed positions surrounding a listening position by combining sound beams reflected on wall surfaces of a room. A phantom is created and localized at a prescribed position between the virtual sound sources; hence, even though the line array speaker unit performs directivity control in a limited manner, it is possible to realize the positional setups for virtual sound sources with a relatively high degree of freedom similarly with a conventionally-known panel-type speaker array. This realizes the free formation of a sound field surrounding a listening position by use of a relatively small number of speakers.

That is, this invention compensates for the weakness of line array speaker units having limited directivity control by way of the localization of the phantom being created using sound beams spreading in a sectorial form. By appropriately setting the arrangement of plural line array speaker units, it is possible to freely localize sound at a desired position.

Furthermore, this invention can reduce the total number of speakers in comparison with the number of speakers used in the conventionally-known panel-type speaker array. This realizes a remarkable decrease in cost. Hence, it is possible to realize a maximal sound field reproduction effect with a minimal number of speakers.

Moreover, the overall area used for arranging line array speaker units can be reduced; and it is possible to freely set up the combination and formation therefor. This increases a degree of freedom with regard to the installation of line array speaker units, which can be easily combined together with a display.

Incidentally, this invention is not necessarily limited to the aforementioned embodiments; hence, variations within the scope of the invention are intended to be embraced by this invention.

The invention claimed is:

1. An audio playback apparatus comprising:
- at least one line array speaker unit having a plurality of speakers arrayed in line;
- an input device that inputs an audio signal;
- a beam control device that:
  - receives at least a first audio signal of a single source or channel among the audio signal input by the input device; and
  - based on the first audio signal, produces and supplies a plurality of first audio signals, each with a prescribed delay time, to each of the plurality of speakers to produce a plurality of sound beams directed to a plurality of different prescribed locations along a plurality of walls to reflect the plurality of sound beams off the different prescribed wall locations of the plurality of walls to form a plurality of virtual sound sources located at the different prescribed wall locations along the plurality of walls; and
- a localization control device that controls the beam control device to change emission directions and intensities of the respective sound beams to localize a phantom, which is located between the virtual sound sources.

2. An audio playback apparatus according to claim 1, wherein a plurality of line array speaker units are arranged horizontally with respect to a listening position.

3. An audio playback apparatus according to claim 1, a plurality of line array speaker units are arranged vertically with respect to a listening position.

4. An audio playback apparatus according to claim 1, wherein a plurality of line array speaker units are arranged slantingly with respect to a listening position.

5. An audio playback apparatus according to claim 1, wherein the sound beams emitted from the line array speaker unit are distributed and spread in a sectorial form towards a listening position.

6. A method of controlling an audio playback apparatus having at least one line array speaker unit having a plurality of speakers arrayed in line, an input device, a beam control device, and a localization control device, the method comprising the steps of:
- inputting through the input device an audio signal;
- receiving at least a first audio signal of a single source or channel among the audio signal input by the input device with the beam control device;
- based on the first audio signal, producing and supplying, with the beam control device, a plurality of first audio signals, each with a prescribed delay time, to each of the plurality of speakers to produce a plurality of sound beams;
- directing the plurality of sound beams to a plurality of different prescribed locations along a plurality of walls to reflect the plurality of sound beams off the different prescribed wall locations of the plurality of walls to form a plurality of virtual sound sources located at the different prescribed wall locations along the plurality of walls; and
- controlling the beam control device, with the localization control device, to change emission directions and intensities of the respective sound beams to localize a phantom, which is located between the virtual sound sources.

7. An audio playback method according to claim 6, wherein the sound beams emitted from the line array speaker unit are distributed and spread in a sectorial form towards a listening position.

8. An audio playback apparatus according to claim 1, further comprising:
- at least three line speaker units each having a plurality of speakers arrayed in line;
- a video display having a rectangular shape; and
- a display housing each of the line speaker units to border on one of three sides of the video display.

9. A speaker system comprising:
- at least one array speaker unit having a plurality of speakers arrayed in line;
- an input device that inputs an audio signal;
- a beam control device that:
  - receives at least a first audio signal of a single source or channel among the audio signal input by the input device; and
  - based on the first audio signal, produces and supplies a plurality of first audio signals, each with a prescribed delay time, to each of the plurality of speakers to produce a plurality of sound beams directed to a plurality of different prescribed locations along the plurality of walls to reflect the plurality of sound beams off the different prescribed wall locations of the plurality of walls to form a plurality of virtual sound sources located at the different prescribed wall locations along the plurality of walls; and
- a localization control device that controls the beam control device to change emission directions and intensities of the respective sound beams to localize a phantom, which is located between the virtual sound sources.

10. A speaker system according to claim 9, wherein a combination of a plurality of speaker units is used to change directivity.

11. A speaker system according to claim 9, wherein a plurality of speaker units are arrayed in a prescribed direction alternately in vertical position with respect to the prescribed direction.

12. An audio playback apparatus according to claim 2, wherein the sound beams emitted from the line array speaker unit are distributed and spread in a sectorial form towards a listening position.

13. An audio playback apparatus according to claim 3, wherein the sound beams emitted from the line array speaker unit are distributed and spread in a sectorial form towards a listening position.

14. An audio playback apparatus according to claim 4, wherein the sound beams emitted from the line array speaker unit are distributed and spread in a sectorial form towards a listening position.

15. An audio playback apparatus according to claim 1, further comprising:
- a decoder,
- wherein the input audio signal is a multi-channel signal
- wherein the decoder divides the multi-channel signal into a plurality of channel signals, and
- wherein the first audio signal is one of the plurality of channel signals.

16. An audio playback method according to claim 6, wherein the audio playback apparatus further comprises:

a decoder, wherein the input audio signal is a multi-channel signal, wherein the decoder divides the multi-channel signal into a plurality of channel signals, and wherein the first audio signal is one of the plurality of channel signals.

17. A speaker system according to claim 9, further comprising:

a decoder, wherein the input audio signal is a multi-channel signal, wherein the decoder divides the multi-channel signal into a plurality of channel signals, and wherein the first audio signal is one of the plurality of channel signals.

* * * * *